US012456478B2

(12) United States Patent
Reutelhuber et al.

(10) Patent No.: US 12,456,478 B2
(45) Date of Patent: Oct. 28, 2025

(54) APPARATUS, METHOD OR COMPUTER PROGRAM FOR GENERATING AN OUTPUT DOWNMIX REPRESENTATION

(71) Applicant: Fraunhofer-Gesellschaft zur Förderung der angewandten Forschung e.V., Munich (DE)

(72) Inventors: Franz Reutelhuber, Erlangen (DE); Eleni Fotopoulou, Erlangen (DE); Markus Multrus, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 618 days.

(21) Appl. No.: 17/501,993

(22) Filed: Oct. 14, 2021

(65) Prior Publication Data

US 2022/0036911 A1 Feb. 3, 2022

Related U.S. Application Data

(63) Continuation of application No. PCT/EP2020/061233, filed on Apr. 22, 2020.

(30) Foreign Application Priority Data

Apr. 23, 2019 (EP) .................................... 19170621
Jul. 29, 2019 (WO) ................. PCT/EP2019/070376

(51) Int. Cl.
*G10L 21/04* (2013.01)
*G10L 19/008* (2013.01)
(Continued)

(52) U.S. Cl.
CPC ............ *G10L 21/04* (2013.01); *G10L 19/008* (2013.01); *G10L 19/022* (2013.01); *H04S 1/007* (2013.01); *H04S 7/30* (2013.01); *H04S 2400/03* (2013.01)

(58) Field of Classification Search
CPC ..... G10L 21/04; G10L 19/008; G10L 19/022; G10L 19/02; G10L 19/00; G10L 19/0208;
(Continued)

(56) References Cited

U.S. PATENT DOCUMENTS 6,005,948 A 12/1999 Maeda
8,515,104 B2 8/2013 Dickins et al.
(Continued)

FOREIGN PATENT DOCUMENTS

CN 105580391 A 5/2016
CN 106796804 A 5/2017
(Continued)

OTHER PUBLICATIONS

3GPP TS 26.445, Technical Specification Group Services and System Aspects; Codec for Enhanced Voice Services (EVS); Detailed Algorithmic Description.
(Continued)

*Primary Examiner* — Leshui Zhang
(74) *Attorney, Agent, or Firm* — Perkins Coie LLP; Michael A. Glenn

(57) ABSTRACT

An apparatus for generating an output downmix representation from an input downmix representation, wherein at least a portion of the input downmix representation is in accordance with a first downmixing scheme, includes: an upmixer for upmixing at least the portion of the input downmix representation using an upmixing scheme corresponding to the first downmixing scheme to obtain at least one upmixed portion; and a downmixer for downmixing the at least one upmixed portion in accordance with a second downmixing scheme different from the first downmixing scheme.

6 Claims, 10 Drawing Sheets

(51) Int. Cl.
*G10L 19/022* (2013.01)
*H04S 1/00* (2006.01)
*H04S 7/00* (2006.01)

(58) Field of Classification Search
CPC ... G10L 19/04; G10L 19/0017; G10L 19/173; G10L 19/18; G10L 19/24; G10L 19/08; G10L 19/0212; H04S 1/007; H04S 1/00; H04S 1/002; H04S 3/002; H04S 3/00; H04S 7/30; H04S 7/00; H04S 2400/03; H04S 2400/01; H04S 2400/05; H04S 2420/07; H04S 3/008; H04S 2420/03; H04S 3/02; H04S 5/00; H04S 2400/11; H04S 5/005; H04S 5/02; H04S 2420/01; G06F 12/0815
USPC .................. 704/500–504; 381/1–23, 61, 63, 381/300–311, 26, 27, 119, 123, 106, 103, 381/100, 101, 102, 77, 80, 81, 82, 85; 700/94
See application file for complete search history.

(56) References Cited

U.S. PATENT DOCUMENTS

| | | | | |
|---|---|---|---|---|
| 2006/0233379 | A1* | 10/2006 | Villemoes | G10L 19/008 381/23 |
| 2007/0140499 | A1 | 6/2007 | Davis et al. | |
| 2007/0194952 | A1 | 8/2007 | Breebaart et al. | |
| 2011/0170721 | A1* | 7/2011 | Dickins | H04S 7/306 381/300 |
| 2011/0224994 | A1 | 9/2011 | Norvell et al. | |
| 2012/0014526 | A1 | 1/2012 | Stoll et al. | |
| 2012/0263308 | A1 | 10/2012 | Herre et al. | |
| 2016/0157040 | A1* | 6/2016 | Ertel | H04S 5/005 381/18 |
| 2017/0309288 | A1* | 10/2017 | Koppens | H04S 3/008 |
| 2017/0365263 | A1 | 12/2017 | Disch et al. | |
| 2018/0124541 | A1 | 5/2018 | Ertel et al. | |
| 2018/0197552 | A1* | 7/2018 | Fuchs | G10L 25/18 |
| 2018/0293992 | A1* | 10/2018 | Chebiyyam | G10L 19/008 |

FOREIGN PATENT DOCUMENTS

| | | | |
|---|---|---|---|
| JP | 2007531913 | A | 11/2007 |
| JP | 2016527804 | A | 9/2016 |
| JP | 2017017749 | A | 1/2017 |
| KR | 20060121985 | A | 11/2006 |
| RU | 2380766 | C2 | 1/2010 |
| TW | 201103008 | A | 1/2011 |
| WO | 2010097748 | A1 | 9/2010 |
| WO | 2013186343 | A2 | 12/2013 |
| WO | 2014161996 | A2 | 10/2014 |
| WO | 2016050854 | A1 | 4/2016 |
| WO | 2017125562 | A1 | 7/2017 |
| WO | 2017125563 | A1 | 7/2017 |
| WO | 2018086946 | A1 | 5/2018 |

OTHER PUBLICATIONS

A. Adami, E. Habets und J. Herre, "Down-mixing using coherence suppression," in IEEE International Conference on Acoustics, Speech and Signal Processing, Florence, 2014.
F. Baumgarte, C. Faller und P. Kroon, "Audio Coder Enhancement using Scalable Binaural Cue Coding with Equalized Mixing," in 116th Convention of the AES, Berlin, 2004.
ISO/IEC 23008-3:, Information technology—High efficiency coding and media delivery in heterogeneous environments—Part 3: 3D audio.
ITU-R BS.775-2, Multichannel Stereophonic Sound System With and Without Accompanying Picture, Jul. 2006.
Jeroen Breebaart, et al, "Background, Concept, and Architecture for the Recent MPEG Surround Standard on Multichannel Audio Compression", AES, 60 East 42nd Street, Room 2520 New York 10165-2520, USA, May 1, 2007 (May 1, 2007), pp. 331-351,XP040377939.
Lapierre Jimmy et al: "On Improving Parametric Stereo Audio Coding", AES Convention 120; May 2006, AES, 60 East 42ND Street, Room 2520 New York 10165-2520, USA, May 1, 2006 (May 1, 2006), XP040507698.
M. Kim, E. Oh und H. Shim, "Stereo audio coding improved by phase parameters," in 129th Convention of the AES, San Francisco, 2010.

* cited by examiner $$L_i = mid_i + \hat{g}_b * mid_i + res_i$$

$$R_i = mid_i - \hat{g}_b * mid_i - res_i$$

$res_i$ : residual signal for spectral bins $_i$ $\hat{g}_b$ : side gain for band $_b$ Fig. 5
(upmixing scheme )

- each band $b_i$ has several spectral lines
- number of spectral lines per band increases with frequency

APPARATUS, METHOD OR COMPUTER PROGRAM FOR GENERATING AN OUTPUT DOWNMIX REPRESENTATION

CROSS-REFERENCES TO RELATED APPLICATIONS

This application is a continuation of copending International Application No. PCT/EP2020/061233, filed Apr. 22, 2020, which is incorporated herein by reference in its entirety, and additionally claims priority from European Application No. EP 19170621.7, filed Apr. 23, 2019, and from International Application No. PCT/EP2019/070376, filed Jul. 29, 2019, both of which are incorporated herein by reference in their entirety.

The present invention is related to multichannel processing and, particularly, to multichannel processing providing the possibility for a mono output.

BACKGROUND OF THE INVENTION

While a stereo encoded bitstream will usually be decoded to be played back on a stereo system, not all devices that are able to receive a stereo bitstream will typically be able to output a stereo signal. A possible scenario would be playback of the stereo signal on a mobile phone with only a mono speaker. With the advent of multi-channel mobile communication scenarios as supported by the emerging 3GPP IVAS standard a stereo-to-mono downmix may therefore be used that is free of additional delay and complexity-wise as efficient as possible while also providing the best possible perceptual quality beyond what is achievable with a simple passive downmix.

There are multiple ways of converting a stereo signal to a mono signal. The most direct ways of doing it is by a passive downmix [1] in time-domain which generates a mid-signal by adding the left and right channels and scaling the result:

$$\text{Mid} = \frac{(\text{Left} + \text{Right})}{2}$$

Further more sophisticated (i.e. active) time-domain based downmixing methods include energy-scaling in an effort to preserve the overall energy of the signal [2] [3], phase alignment to avoid cancellation effects [4] and prevention of comb-filter effects by coherence suppression [5].

Another method is to do the energy-correction in a frequency-dependent manner by calculation separate weighting factors for multiple spectral bands. For instance, this is done as part of the MPEG-H format converter [6], where the downmix is performed on a hybrid QMF subband representation of the signals with additional prior phase alignment of the channels. In [7], a similar band-wise downmix (including both phase and temporal alignment) is already used for the parametric low-bitrate mode DFT Stereo where the weighting and mixing is applied in the DFT domain.

The solution of a passive stereo-to-mono downmix in time-domain after decoding the stereo signal is not ideal as it is well known that a purely passive downmix comes with certain shortcomings, e.g. phase cancellation effects or general loss of energy, which can—depending on the item—severely degrade the quality.

Other active downmixing methods that are purely time-domain based mitigate some of problems of the passive downmix but are still suboptimal due to the lack of frequency-dependent weighting.

With the implicit constraints for mobile communication codecs like IVAS (Immersive Voice and Audio Services) in terms of delay and complexity, having a dedicated post-processing stage like the MPEG-H format converter for applying a band-wise downmix is also not an option as the transforms to frequency domain and back which may be performed will inevitably cause an increase in both complexity and delay.

In a DFT-based stereo system as described in [8] that uses only parameter-based residual prediction to restore the stereo signal at the decoder and where the mid-signal is generated by an active downmix as described in [7], a sufficiently good mono signal is available at the decoder. However, if spectral parts of the signal rely on a coded residual signal for stereo restoration that was generated by an M/S transform, the mono signal available before the stereo upmix is not suitable anymore. In this case the mono signal will spectrally consist in part of the mid-signal from the M/S transform (residual coding part) which is equal to a passive downmix and partially of an active downmix (residual prediction part). This mixture of two different downmixing methods leads to artifacts and energy imbalances in signal.

SUMMARY

According to an embodiment, an apparatus for generating an output downmix representation from an input downmix representation, wherein at least a portion of the input downmix representation is in accordance with a first downmixing scheme, may have: an upmixer for upmixing at least the portion of the input downmix representation using an upmixing scheme corresponding to the first downmixing scheme to obtain at least one upmixed portion; and a downmixer for downmixing the at least one upmixed portion in accordance with a second downmixing scheme different from the first downmixing scheme to obtain a first downmixed portion representing the output downmix representation for at least the portion of the input downmix representation.

According to another embodiment, a multichannel decoder may have: an input interface for providing an input downmix representation and parametric data at least for a second portion of the input downmix representation; and the apparatus for generating an output downmix representation from an input downmix representation, wherein at least a portion of the input downmix representation is in accordance with a first downmixing scheme, which apparatus may have:

an upmixer for upmixing at least the portion of the input downmix representation using an upmixing scheme corresponding to the first downmixing scheme to obtain at least one upmixed portion; and a downmixer for downmixing the at least one upmixed portion in accordance with a second downmixing scheme different from the first downmixing scheme to obtain a first downmixed portion representing the output downmix representation for at least the portion of the input downmix representation, wherein the multichannel decoder is configured to upmix, with the upmixer, the input downmix representation for at least the portion of the input downmix representation or only the portion of the input downmix representation in accordance with the upmixing scheme corresponding to the first downmixing scheme to obtain the at least one upmixed portion, and/or to upmix the input downmix representation for the second portion and the parametric data using a second upmixing scheme corresponding to the second downmixing scheme to obtain an upmixed second portion, and wherein a combiner is configured to combine the at least one upmixed portion and the upmixed second portion to obtain a multichannel output signal.

According to yet another embodiment, a method for generating an output downmix representation from an input downmix representation, wherein at least a portion of the input downmix representation is in accordance with a first downmixing scheme, may have the steps of: upmixing the input downmix representation of at least the portion of the input downmix representation using an upmixing scheme corresponding to the first downmixing scheme to obtain an at least one upmixed portion; and downmixing the at least one upmixed portion in accordance with a second downmixing scheme different from the first downmixing scheme to obtain a first downmixed portion representing the output downmix representation for at least the portion of the input downmix representation.

According to still another embodiment, a method of multichannel decoding may have the steps of: providing an input downmix representation and parametric data at least for a second portion of the input downmix representation; the method for generating an output downmix representation from an input downmix representation, wherein at least a portion of the input downmix representation is in accordance with a first downmixing scheme, the method for generating an output downmix representation may have the steps of:

upmixing the input downmix representation of at least the portion of the input downmix representation using an upmixing scheme corresponding to the first downmixing scheme to obtain an at least one upmixed portion; and downmixing the at least one upmixed portion in accordance with a second downmixing scheme different from the first downmixing scheme to obtain a first downmixed portion representing the output downmix representation for at least the portion of the input downmix representation, wherein the method may have the steps of: upmixing the input downmix representation for at least the portion of the input downmix representation or only the portion of the input downmix representation in accordance with the upmixing scheme corresponding to the first downmixing scheme to obtain the at least one upmixed portion, and/or upmixing the second portion of the input downmix representation and the parametric data using a second upmixing scheme corresponding to the second downmixing scheme to obtain an upmixed second portion, and combining the at least one upmixed portion and the upmixed second portion to obtain a multichannel output signal.

According to an embodiment, a non-transitory digital storage medium may have a computer program stored thereon to perform the inventive methods, when said computer program is run by a computer.

According to an embodiment, an apparatus for generating an output downmix representation from an input downmix representation, wherein a first portion of the input downmix representation is in accordance with a first downmixing scheme and a second portion of the input downmix representation is in accordance with the second downmixing scheme, may have: an upmixer for upmixing the first portion of the input downmix representation using a first upmixing scheme corresponding to the first downmixing scheme to obtain a first upmixed portion and for upmixing the second portion of the input downmix representation using a second upmixing scheme corresponding to the second downmixing scheme to obtain a second upmixed portion; and a downmixer for downmixing the first upmixed portion and the second upmixed portion in accordance with a third downmixing scheme different from the first downmixing scheme and the second downmixing scheme to obtain the output downmix representation, wherein the output representation for the first portion of the input downmix representation and the output representation for the second portion of the input downmix representation are based on the same downmixing scheme of the input downmix representation.

An apparatus for generating an output downmix representation from an input downmix representation, where at least a portion of the input downmix representation is in accordance with a first downmixing scheme, comprises an upmixer for upmixing at least a portion of the input downmix representation using an upmixing scheme corresponding to the first downmixing scheme to obtain at least one upmixed portion. Furthermore, the apparatus comprises a downmixer for downmixing the at least one upmixed portion in accordance with a second downmixing scheme different from the first downmixing scheme.

In another embodiment, the portion of the input downmix representation is in accordance with the downmixing scheme and, additionally, a second portion of the input donwmix representation is in accordance with a second downmixing scheme being different from the first downmixing scheme. In this embodiment, the downmixer is configured for downmixing the upmix portion in accordance with the second downmixing scheme or in accordance with a third downmixing scheme different from the downmixing scheme and the second downmixing scheme to obtain the first downmixed portion. Now, the situation with respect to the downmixed portion is such that the first downmixed portion and the second portion are related and, as one could say, in the same downmix scheme domain, so that the first downmixed portion and the second downmixed portion or a downmixed portion derived from the second downmixed portion can be combined by a combiner to obtain the output downmix representation comprising an output representation for the first portion and an output representation for the second portion, where the output representation for the first portion and the output representation for the second portion are based on the same downmixing scheme, i.e., are located in one and the same downmixing domain and are, therefore, "harmonized" with each other.

In a further embodiment, either the whole bandwidth or just a portion of the input downmix representation is based on a downmixing scheme relying on parameters and a residual signal or only relying on a residual signal without parameters. In such a context, the input downmix representation comprises a core signal, a residual signal or a residual signal and parameters. This signal is upmixed using the side information, i.e., using the parameters and the residual signal or using just the residual signal. The upmix comprises all the available information including the residual signal and a downmix is performed into the second downmixing scheme which is different from the first downmixing scheme, i.e., which is, advantageously, an active downmix having measures for addressing energy calculations or, in other words, a downmixing scheme that does not generate a residual signal and, advantageously, does not generate a residual signal and any parameters.

Such a downmix provides a good and pleasant and high quality audio mono rendering possibility, while the core signal of the input downmix representation when used without upmixing and subsequent downmixing does not provide any pleasant and high quality audio reproduction if rendered without advantageously taking into consideration the residual signal and the parameters.

In accordance with this embodiment, the apparatus for generating an output downmix representation performs a conversion of a residual-like downmixing scheme into a non-residual like downmixing scheme. This conversion can be performed either in the full band or can also be performed in a partial band. Typically, and in advantageous embodiments, the lowband of a multichannel-encoded signal comprises a core signal, a residual signal and advantageously parameters. However, in the highband, less precision is provided in favor of a lower bit rate and, therefore, in such a highband an active downmix is sufficient without any additional side information such as residual data or parameters. In such a context, the lowband which is in the residual-downmix domain is converted into the non-residual downmix domain and the result is combined with the highband that is already in the "correct" non-residual downmix domain.

In a further embodiment, it is not required that the first portion is converted from the first downmix domain into the same downmix domain, in which the second portion is located. Instead, in further embodiments, where the first portion is in the first downmix domain and the second portion of the input representation is in the second downmix domain, both these portions are converted into another third downmix domain by upmixing the first portion in accordance with the first upmixing scheme corresponding to the first downmixing scheme. Additionally, the second portion is upmixed in accordance with the second upmixing scheme corresponding to the second downmixing scheme, and both upmixes are downmixed, advantageously by an active downmix without any residual or parametric data, into the third downmixing scheme, which is different from the first and the second downmixing schemes.

In further embodiments, more than two portions and, in particular, spectral portions or spectral bands, can be available that are in different downmix representations. By means of the present invention, where, advantageously, the upmixing and subsequent downmixing is performed in the spectral domain, individual processings for individual bands can be performed without interference from one spectral band to the other spectral band. At the output of the downmixer, all bands are in the same "downmix" domain and, therefore, a spectrum for the mono output downmix representation exists, which can be converted into a time domain representation by a spectrum-time-converter such as a synthesis bank, an inverse discrete Fourier transform, an inverse MDCT domain or any other such transform. The combination of the individual bands and the conversion into the time domain can be implemented by means of such a synthesis filter bank. In particular, it is irrelevant whether the combination is performed before the actual conversion, i.e., in the spectral domain. In such a situation, the combination takes place before the spectrum-time transform, i.e., at the input into the synthesis filter bank and only a single transform is performed to obtain a single time domain signal. However, the equivalent implementation consists in the implementation where the combiner performs a spectrum-time transform for each band individually, so that the time domain output of each such individual transform represents a time domain representation but in a certain bandwidth, and the individual time domain outputs are combined in a sample-by-sample manner advantageously subsequent to some kind of upsampling when critically sampled transforms have been implemented.

In a further implementation, the present invention is applied within a multichannel decoder that is operable in two different modes, i.e., in the multichannel output mode as the "normal" mode and that is also operable in a second mode such as an "exceptional mode" which is the mono output mode. This mono output mode is particularly useful when the multichannel decoder is implemented within a device which only has a mono speaker output facility such as a mobile phone having a single speaker or which is implemented in a device that is in some kind of power saving mode where, in order to save battery power or to save processing resources, only a mono output mode is provided even though the device would, basically, also have the possibility for a multichannel or a stereo output mode.

In such an implementation, the multichannel decoder comprises a first time-spectrum transform for the decoded core signal and a second time-spectrum transform facility for the decoder residual signal. Two different upmixing facilities in the spectral domain for two different spectral portions being in two different downmix domains are provided and the corresponding left channel spectral lines are combined by a combiner such as a synthesis filterbank or an IDFT block and the other channel spectral lines are combined by an additional or second synthesis filterbank or IDFT (inverse discrete Fourier transform) block.

In order to enhance such a multichannel decoder, the downmixer for downmixing the at least one upmixed portion in accordance with a second downmixing scheme different from the first downmixing scheme that is advantageously implemented as an active downmixer is provided. Additionally, in an embodiment, two switches and a controller are provided as well. The controller controls a first switch to bypass an upmixer for the highband portion and the second switch is implemented to feed the downmixer with the output of the upmixer. In such a mono output mode, the second combiner or synthesis filterbank is inactive and the upmixer for the highband is inactive as well in order to save processing power. However, in the stereo output mode, the first switch feeds the upmix for the highband and the second switch bypasses the (active) downmixer and both output synthesis filterbanks are active in order to obtain the left stereo output signal and the right output signal.

Since the mono output is calculated in the spectral domain such as the DFT domain, the generation of the mono output does not incur any additional delay compared to the generation of the stereo output, because any additional time-frequency transforms compared to the stereo processing mode are not necessary. Instead, one of the two stereo mode synthesis filterbanks are used for the mono mode as well. Furthermore, compared to the stereo output that, typically, provides an enhanced audio experience compared to the mono output, the mono processing mode saves complexity and, in particular, processing resources and, therefore, battery power in a low power mode particularly useful for a battery-powered mobile device. This is true, since the highband upmixer that is normally used in the stereo mode can be deactivated and, additionally, a second output filterbank that may also be used for the stereo output mode is deactivated as well. Instead, only a low complexity and low delay active downmix block fully operating in the spectral domain may be used as an additional processing block compared to the stereo mode. The additional processing resources that may be used by this active downmix block, however, are significantly smaller than the processing resources that are saved by deactivating the highband upmixer and the second synthesis filterbank or IDFT block.

Embodiments aim at generating a harmonized mono output signal from a mono input signal that was created by a downmix of a stereo signal where the downmix was done with different methods (e.g. active and passive) for at least two different spectral regions of the stereo signal. The harmonization is achieved by picking one downmix method as the advantageous method for the harmonized signal and transforming all spectral parts that were downmixed via different methods to the advantageous method. This is achieved by first upmixing these spectral parts using all the side parameters which may be used for the upmix to regain an LR representation in the respective spectral regions. Again using all the parameters that may be used for the advantageous downmix method, the spectral parts are converted to a mono representation by applying the advantageous method to the stereo representation. A harmonized mono output signal is generated that avoids the problems a non-uniform downmix without additional delay and complexity.

BRIEF DESCRIPTION OF THE DRAWINGS

Embodiments of the present invention will be detailed subsequently referring to the appended drawings, in which:

FIG. 5 illustrates an advantageous implementation of the upmixing scheme corresponding to the first downmixing scheme in an embodiment;

DETAILED DESCRIPTION OF THE INVENTION

Figure 1:
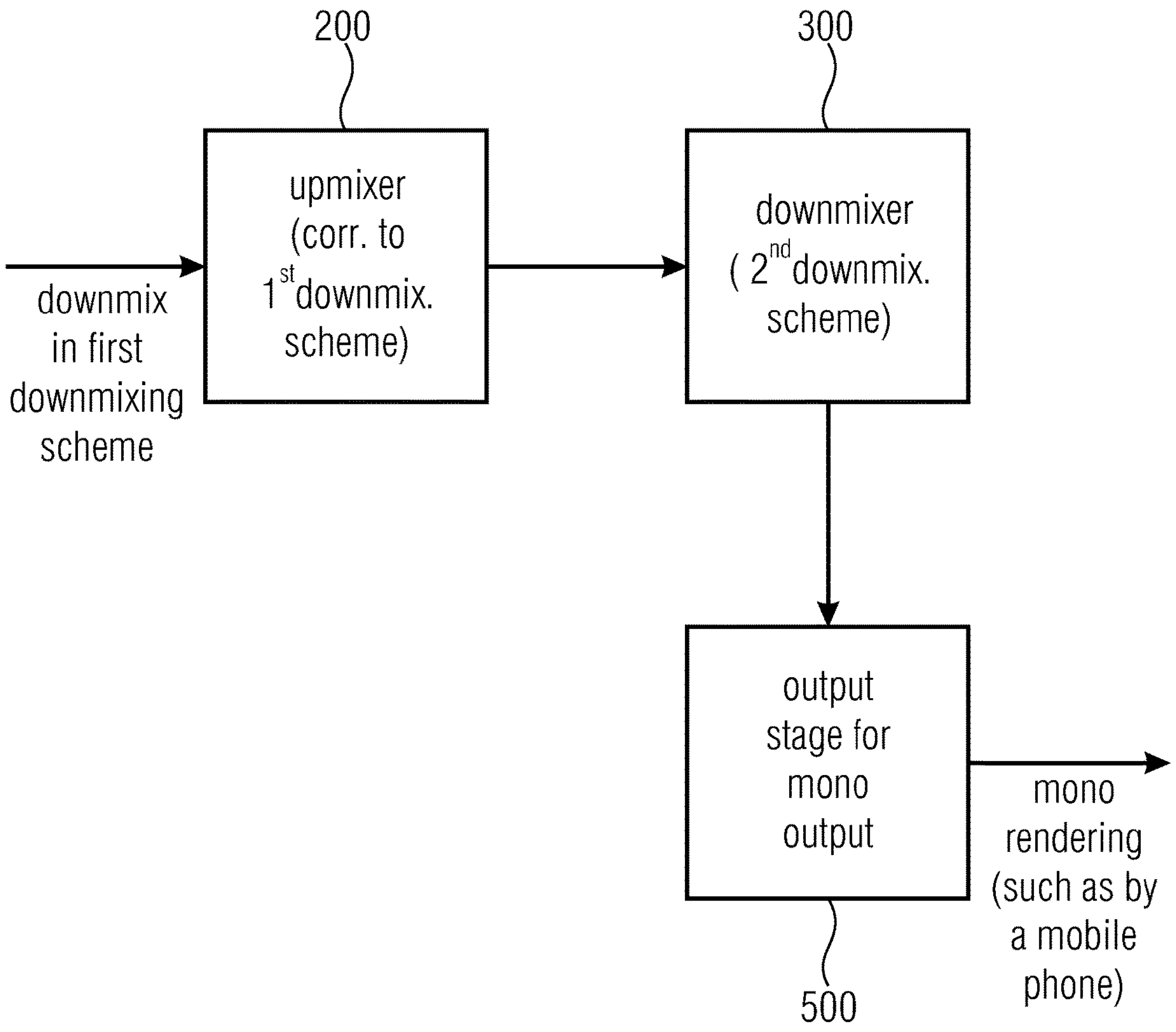
FIG. 1 illustrates an apparatus for generating an output downmix representation in an embodiment.

FIG. 1 illustrates an apparatus for generating an output downmix representation from an input downmix representation, where at least a portion of the input downmix representation is in accordance with a first downmixing scheme. The apparatus comprises an upmixer 200 for upmixing at least the portion of the input downmix representation using an upmixing scheme corresponding to the first downmixing scheme to obtain at least one upmixed portion at the output of block 200. The apparatus furthermore comprises a downmixer 300 for downmixing the at least one upmixed portion in accordance with a second downmixing scheme being different from the first downmixing scheme.

Advantageously, the output of the downmixer 300 is forwarded to an output stage 500 for generating a mono output. The output stage is, for example, an output interface for outputting the output downmix representation to a rendering device or the output stage 500 actually comprises a rendering device for rendering the output downmix representation as a mono replay signal.

The apparatus illustrated in FIG. 1 provides a conversion from a downmix representation in a first "downmix domain" into another second downmix domain. As will be illustrated in other figures, the conversion can be valid only for a limited part of the spectrum such as the first portion illustrated, for example, in FIG. 9 for the exemplarily given lowest three bands $b_1$, $b_2$ and $b_3$. Alternatively, the apparatus can also perform a conversion from one downmix domain to another downmix domain for the full band, i.e., for all bands $b_1$ to $b_6$ exemplarily illustrated in FIG. 9. The portion can be any portion of the signal such as a spectral portion, a time portion such as a time block or frame, or any other portion of the signal.

Figure 2:
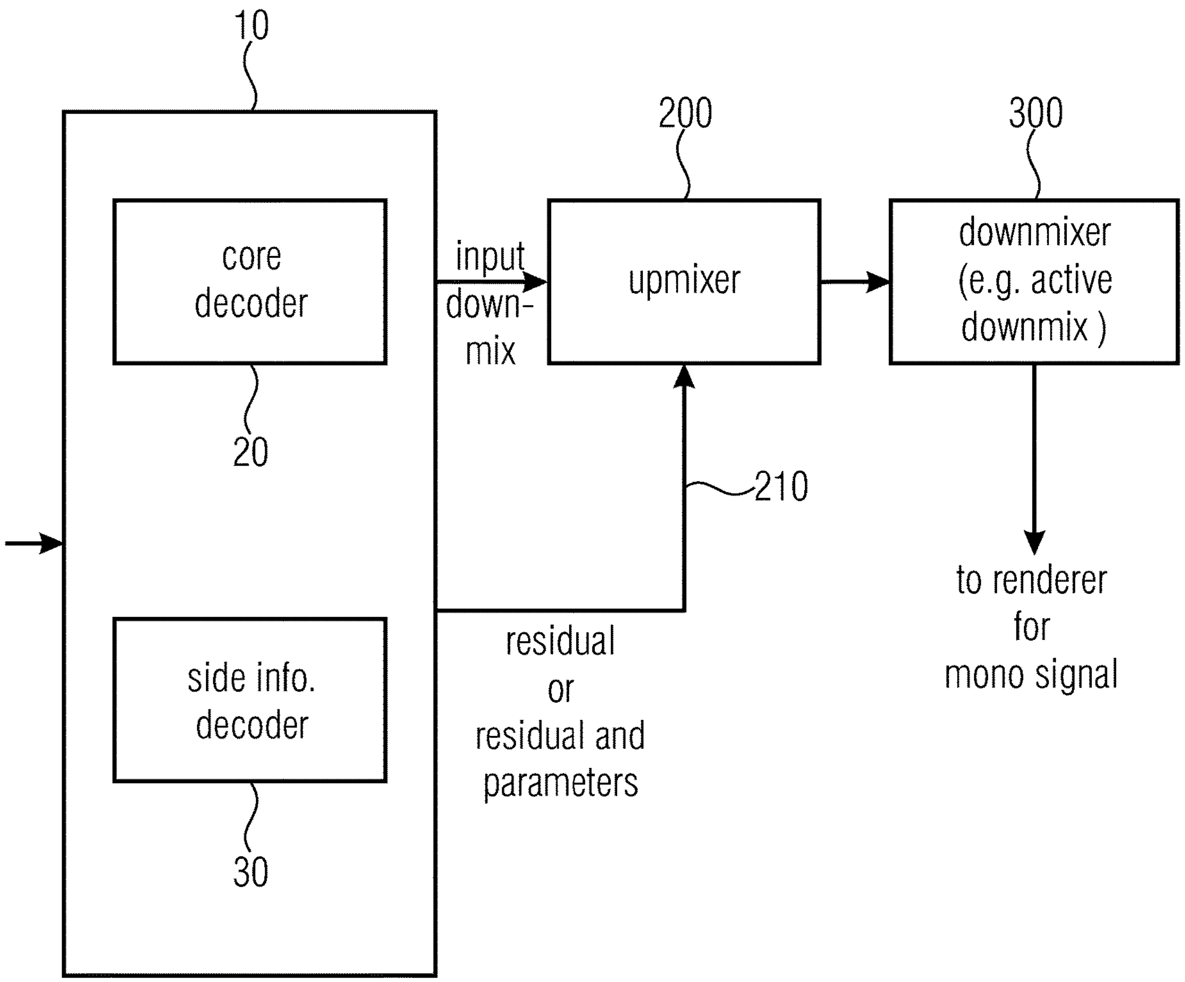
FIG. 2 illustrates an apparatus for generating an output downmix representation in a further embodiment, in which the downmixing scheme is based on a residual signal or a residual signal and parameters.

FIG. 2 illustrates an embodiment where the first downmixing scheme relies on a residual signal only or on a residual signal and parametric information. FIG. 2 comprises an input interface 10 where the input interface receives an encoded multichannel signal that comprises an encoded core signal and an encoded side information part. The core signal is decoded by a core decoder 20 to provide the input downmix representation without side information. Additionally, the side information part from the encoded multichannel signal is provided and processed by the side information decoder 30 within the input interface, and the side information decoder 30 provides the residual signal or the residual signal and parameters as indicated at 210 in FIG. 2. The data, i.e., the input downmix that corresponds to the decoded core signal and the residual data are both input the upmixer 200 and the upmixer 200 generates an upmix signal that has a first channel and a second channel and the first channel and the second channel data are high quality audio data, since the high quality audio data are generated not only by the core signal and some kind of passive upmix, but are generated additionally using the residual data or the residual data and the parameters, i.e., all data available from the encoded multichannel signal. The output of the upmixer 200 is downmixed by the downmixer 300 using, for example, an active downmix or, generally, a downmixing scheme that does not generate a residual signal or that does not generate any parameters but that generates a downmix or mono signal that is energy-compensated, i.e., that does not suffer from energy fluctuations that are normally a significant problem when only a passive downmix is performed as is, for example, the case with the core signal generated by the core decoder 20 of FIG. 2. The output of the downmixer 300 is forwarded, for example, to a renderer for rendering the mono signal or, for example, to the output stage 500 illustrated in FIG. 1.

Figure 3:
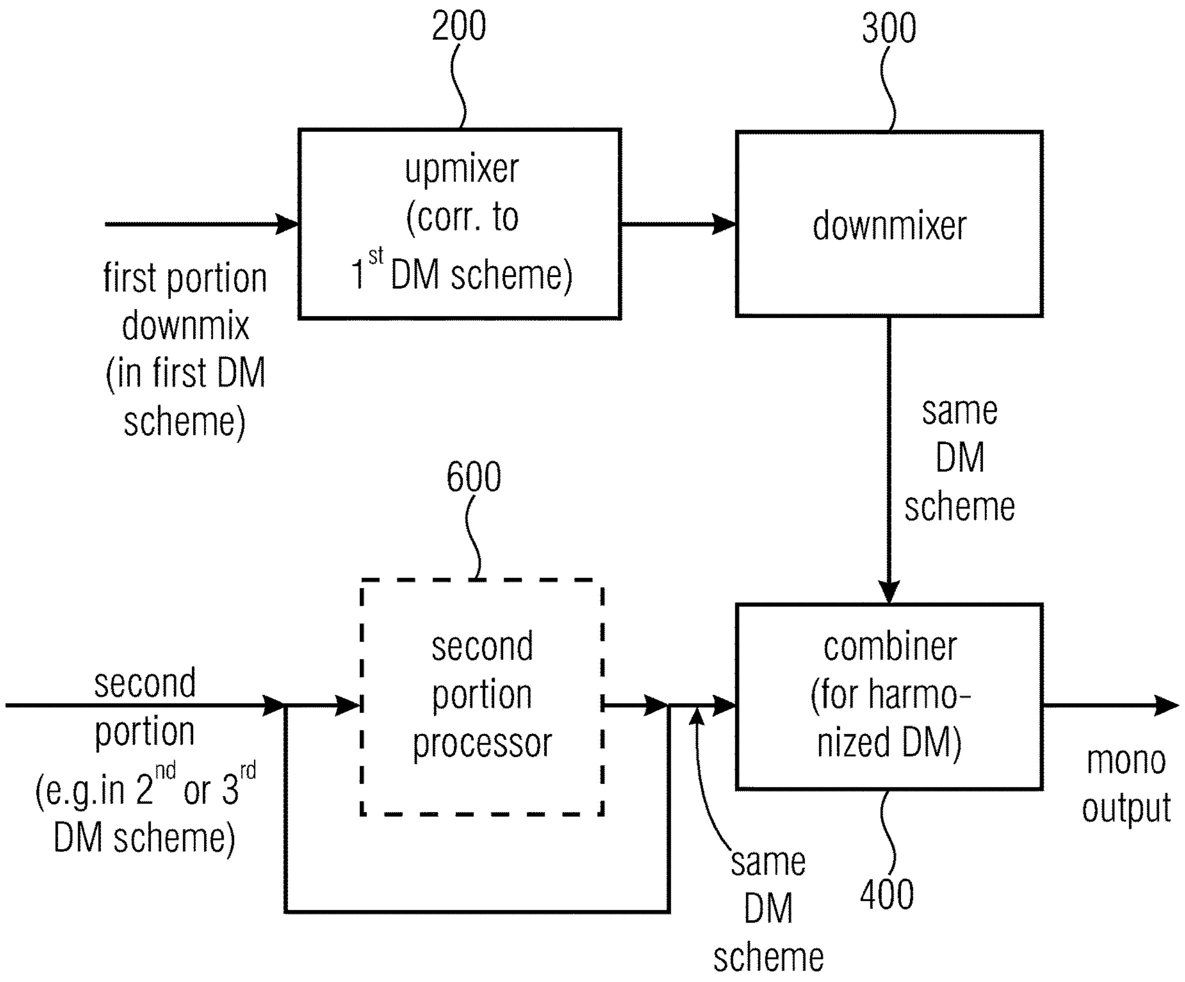
FIG. 3 illustrates a further embodiment, where different downmixing schemes are performed for different portions such as spectral portions of the input downmix representation.

FIG. 3 illustrates a further embodiment where, again referring to FIG. 9, the first portion is available in the first downmixing scheme such as a downmixing scheme with residual data and where there is a second spectral portion that is available, for example in a second downmixing scheme without any residuals, i.e., that has been generated by an active downmix using, for example, downmix weights derived based on energy considerations to combat any fluctuations that otherwise would occur if a passive downmix would be applied.

The first portion of the downmix representation is input into the upmixer 200 that upmixes corresponding to the first downmixing scheme and the first portion is forwarded, as discussed with respect to FIG. 1 or FIG. 2, into the downmixer 300 that now performs a downmix in the second downmixing scheme. The second portion illustrated in FIG. 3 can be, for example, in the second downmixing scheme but can also be in a third, i.e., any other downmixing scheme, from the downmixing scheme of the portion input into the upmixer 200 or the second downmixing scheme output by the downmixer 300. In case of the downmixing domain being the same for the second portion and the output of the downmixer 300, any second portion processor 600 is not required. Instead, the second portion can be forwarded into a combiner 400 for combining the first and the second portion that are now harmonized with respect to their downmixing schemes. However, when the second portion is in a downmixing domain, i.e., has an underlying downmixing scheme being different from the downmixing scheme in which the output of the downmixer 300 is available, the second portion processor 600 is provided. Generally, the second portion processor 600 also comprises an upmixer for upmixing the second portion being in a third downmixing scheme and the second portion processor 600 additionally comprises a downmixer for downmixing the upmixer representation into the same downmixing domain, i.e., using the same downmixing scheme, as is available from the downmixer 300. The second portion processor 600 can be implemented using the upmixer 200 and the subsequently connected downmixer 300 so that a full harmonization of the data input into the combiner 400 is obtained. The combiner 400 outputs, advantageously, a spectral representation of the mono output downmix representation which is converted into the time domain by means of a spectrum-time-converter such as a filterbank, an IDFT, an IMDCT, etc. Alternatively, the combiner 400 is configured for combining the individual inputs into individual time domain signals, and the time domain signals are combined in the time domain to obtain a time domain mono output downmix representation.

Figure 4:
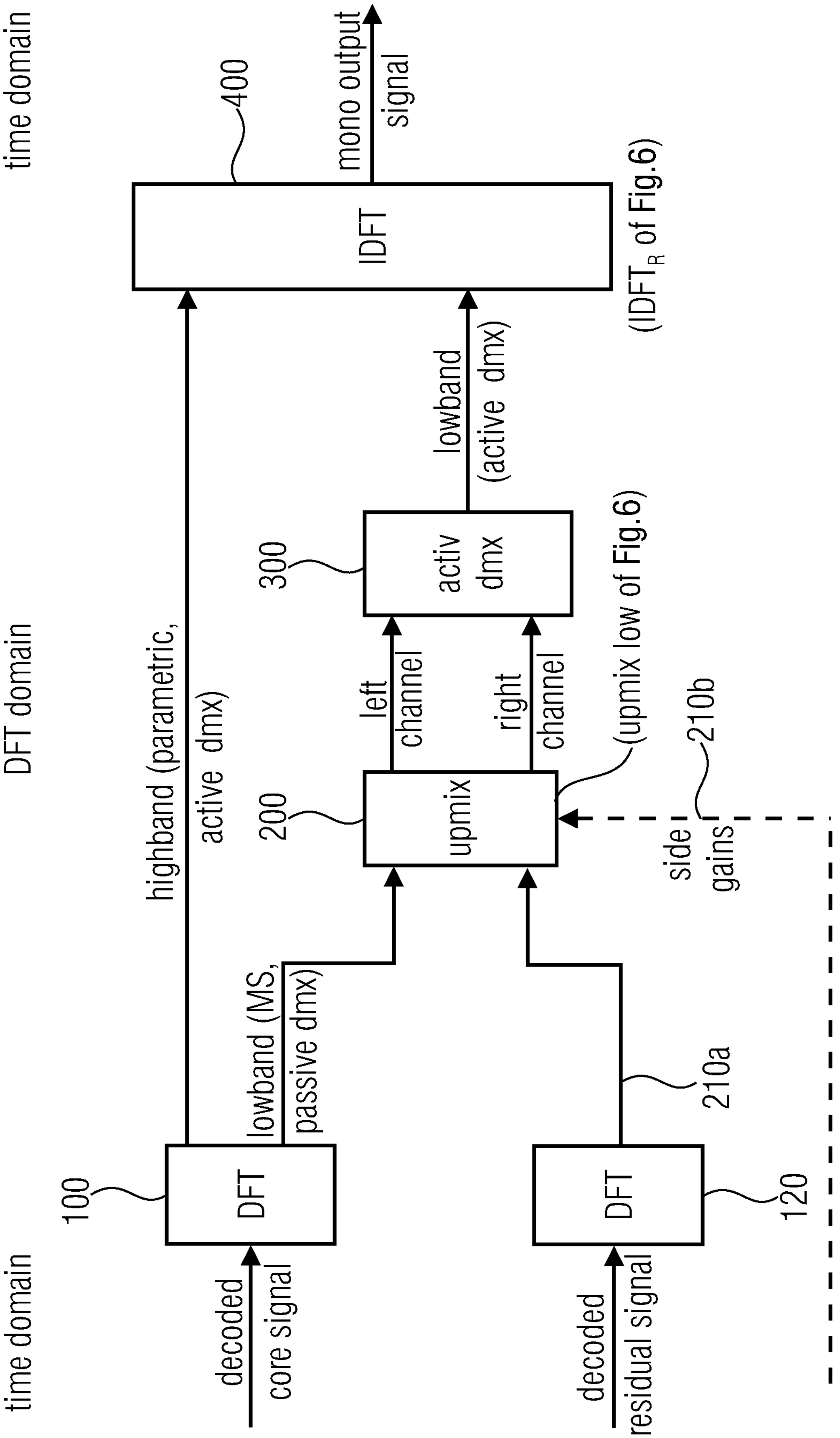
FIG. 4 illustrates a further embodiment illustrating the usage of different downmixing schemes in different spectral portions for the input downmix representation and the procedure where the first downmixing scheme is based on residual data and the second downmixing scheme is an active downmixing scheme or a downmixing scheme without residual or parametric data.
Figure 9:
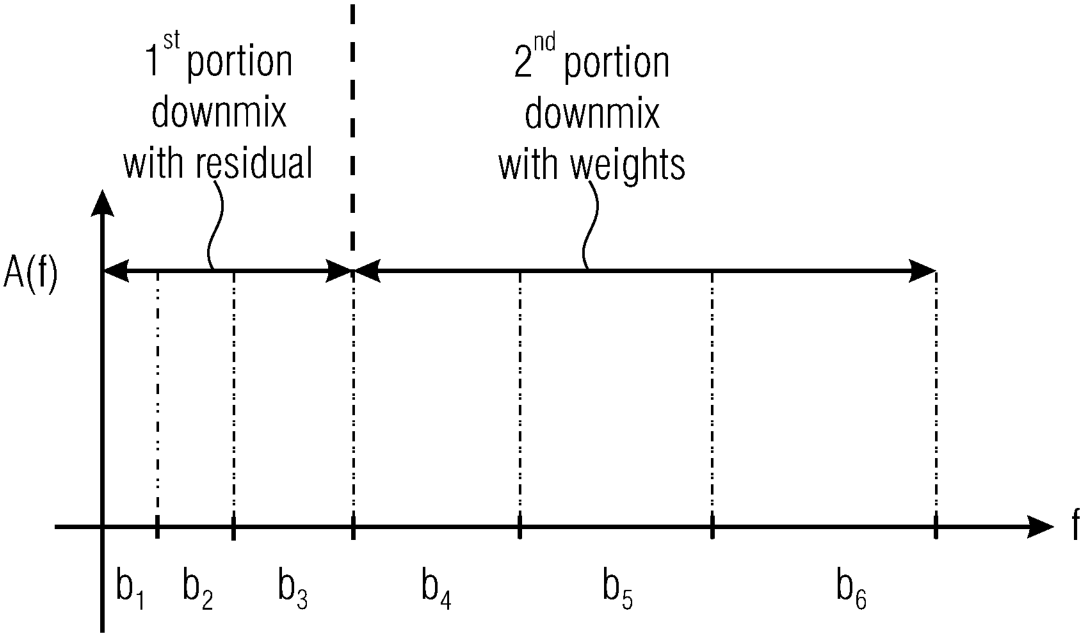
FIG. 9 illustrates the separation of an input downmix representation into the portion of the input downmix representation in the first downmixing scheme indicated as the first portion and into the second portion of the input downmixing representation that relies on a downmixing scheme with weights.

FIG. 4 comprises an input interface that may include a first time-to-spectrum converter 100 such as DFT block as illustrated in FIG. 4 and a second time-to-spectrum converter 120 such as the second DFT block in FIG. 4. The first block 100 is configured for converting the decoded core signal as, for example, output by the core decoder 20 of FIG. 2 into a spectral representation. Furthermore, the second time-to-spectral converter 120 is configured to convert the decoded residual signal as, for example, output by the side information decoder 30 of FIG. 2 into a spectral representation illustrated at 210*a*. Furthermore, line 210*b* illustrates optionally provided additional parametric data such as side gains that are also output by the side information decoder 30 of FIG. 2 for example. The upmixer 200 of FIG. 4 generates an upmixed left channel and an upmixed right channel for a lowband, i.e., exemplary for the first three band $b_1$, $b_2$, $b_3$ of FIG. 9. Furthermore, the lowband upmix at the output of block 200 is input into the downmixer 300 advantageously performing an active downmix so that a lowband representation for the exemplarily illustrated three bands $b_1$, $b_2$, $b_3$ of FIG. 9 is provided. This lowband downmix is now in the same domain as the highband downmix generated already by the DFT block 100. The output of block 100 for the highband would, in the example of FIG. 9, correspond to the downmix representation for bands $b_4$, $b_5$, $b_6$. Now, at the input into the combiner 400, illustrated in FIG. 4 as an IDFT 400, the lowband representation and the highband representation of the downmix are in the same "downmix domain", and have been generated with the same downmixing scheme. Now, the lowband and the highband of the harmonized downmix representation can be combined and advantageously converted into the time domain to provide the mono output signal at the output of block 400.

A mostly parametric stereo scheme as described in [8] is built around the idea of only transmitting a single downmixed channel and recreating the stereo image via side parameters. This downmix at the encoder side is done in an active manner by dynamically calculating weights for both channels in the DFT domain [7]. These weights are computed band-wise using the respective energies of the two channels and their cross-correlation. The target energy that has to be preserved by the downmix is equal to the energy of the phase-rotated mid-channel:

$$E_{target} = \left|\frac{L + Re^{-j\varphi}}{2}\right|^2 = \frac{\langle L, L\rangle + \langle R, R\rangle + 2|\langle L, R\rangle|}{4} = \frac{|L|^2 + |R|^2 + 2|\langle L, R\rangle|}{4},$$

where L and R represent the left and right channel. Based on this target energy the weights for the channels can be computed per band b as follows:

$$w_{Rb} = \frac{1}{2\sqrt{2}} \frac{\sqrt{|L_b|^2 + |R_b|^2 + 2|\langle L_b, R_b\rangle|}}{|L_b| + |R_b|}$$

And $$w_{L,b} = w_{R,b} + 1 - \frac{|L_b| + |R_b|}{|L_b| + |R_b|}.$$

|L| and |R| are computed for each band b as $$|L_b| = \sqrt{\sum_{i\ in\ b} \left(L_{real,i,b^2} + L_{imag,i,b^2}\right)},$$

$$|R_b| = \sqrt{\sum_{i\ in\ b} \left(R_{real,i,b^2} + R_{imag,i,b^2}\right)}$$

|L+R| is computed as $$|L_b + R_b| = \sqrt{|L_b|^2 + |R_b|^2 + 2\text{dotprod}_{real}{}^2}$$

and |<L, R>| is computed as the absolute of the complex dot product $$|\langle L_b, R_b\rangle| = \sqrt{dotprod_{real,b}^2 + dotprod_{imag,b}^2}$$

with

-continued $$dotprod_{real,b} = \sum_{i\ in\ b} (L_{real,i,b} R_{real,i,b} + L_{imag,i,b} R_{imag,i,b})$$

and $$dotprod_{imag,b} = \sum_{i\ in\ b} (L_{imagi,b} R_{real,ib} - L_{real,i,b} R_{imag,i,b})$$

where i specifies the bin number inside spectral band b.

The downmixed spectrum is obtained for each band by adding the weighted spectral bins of left and right channel:

$$DMX_{real,i,b} = W_{L,b} L_{real,i,b} + w_{R,b} R_{real,i,b}$$

and $$DMX_{imag,i,b} = W_{L,b} L_{imag,i,b} + W_{R,b} R_{imag,i,b}.$$

If all the stereo processing in such a system is entirely reliant on parameters and the described active downmix is done on the whole spectrum, a mono signal that satisfies the given quality requirements by avoiding the problems of a passive downmix is already available after the core decoding. This means that in most cases it suffices to skip all decoder stereo processing and output the signal without going into DFT domain.

However, for higher bitrates this kind of system also supports the coding of a residual signal for the lower spectral bands. The residual signal can be seen as the side-signal of an MS-transform of these lowest bands while the core signal is the complementary mid-signal, basically a passive downmix of left and right. To keep the side signal as small as possible, a compensation of the interaural level differences (ILDs) between the channels is applied to it using side gains that are computed per band.

The downmixed mid-channel is computed at the encoder side for every spectral bin i inside the residual coding spectrum as $$mid_i = \frac{L_i + R_i}{2}$$

while the complementary side channel is computed as $$side_i = \frac{L_i - R_i}{2}.$$

The residual signal is obtained by subtracting the predicted part due to an ILD between left and right:

$$res_i = \mathrm{side}_i - g_b * mid_i$$

with side gain $g_b$ of the current spectral band b given as $$g_b = \frac{|L_b|^2 - |R_b|^2}{|L_b + R_b|^2}.$$

The full-band signal going into the core coder is a mixture of passive downmix in lower bands and active downmix in all higher bands. Listening tests have shown that there are perceptual issues when playing back such a mixed signal. A way of harmonizing the different signal parts is therefore useful.

FIG. 5 illustrates a representation of the upmixing scheme relying on residual data res, and parametric data illustrated by bandwise side gain indices $g_{\hat{b}}$. i stands for spectral values and b stands for a certain band. FIG. 5 illustrates a situation, which is also illustrated in FIG. 9, where each band $b_i$ has several spectral lines. In particular, in order to calculate the spectral value $L_i$, the mid-signal spectral value, i.e., the corresponding spectral value with index i of the output of the core decoder 20 or the output of DFT block 100 of FIG. 4 is used. Furthermore, the corresponding parameter $g_{\hat{b}}$ for the corresponding band, in which the spectral value i is located, may be used as illustrated in FIG. 4 by line 210*b* and the residual spectral value as generated by block 120 and as illustrated at line 210*a* for the certain spectral value with index i and for the respective band b may be used as well.

The L-R representations of the lowband signal with residual coding are thereby regained as follows:

$$L_i = mid_i + \widehat{g_b} * mid_i + res_i$$

and $$R_i = mid_i - \widehat{g_b} * mid_i - res_i.$$

Subsequently, the active downmix is applied as described above, only the weights are calculated from the upmixed decoded spectra L and R. The lowband is combined with the already actively downmixed highband to create a harmonized signal which is brought back to time domain via IDFT.

Figure 6:
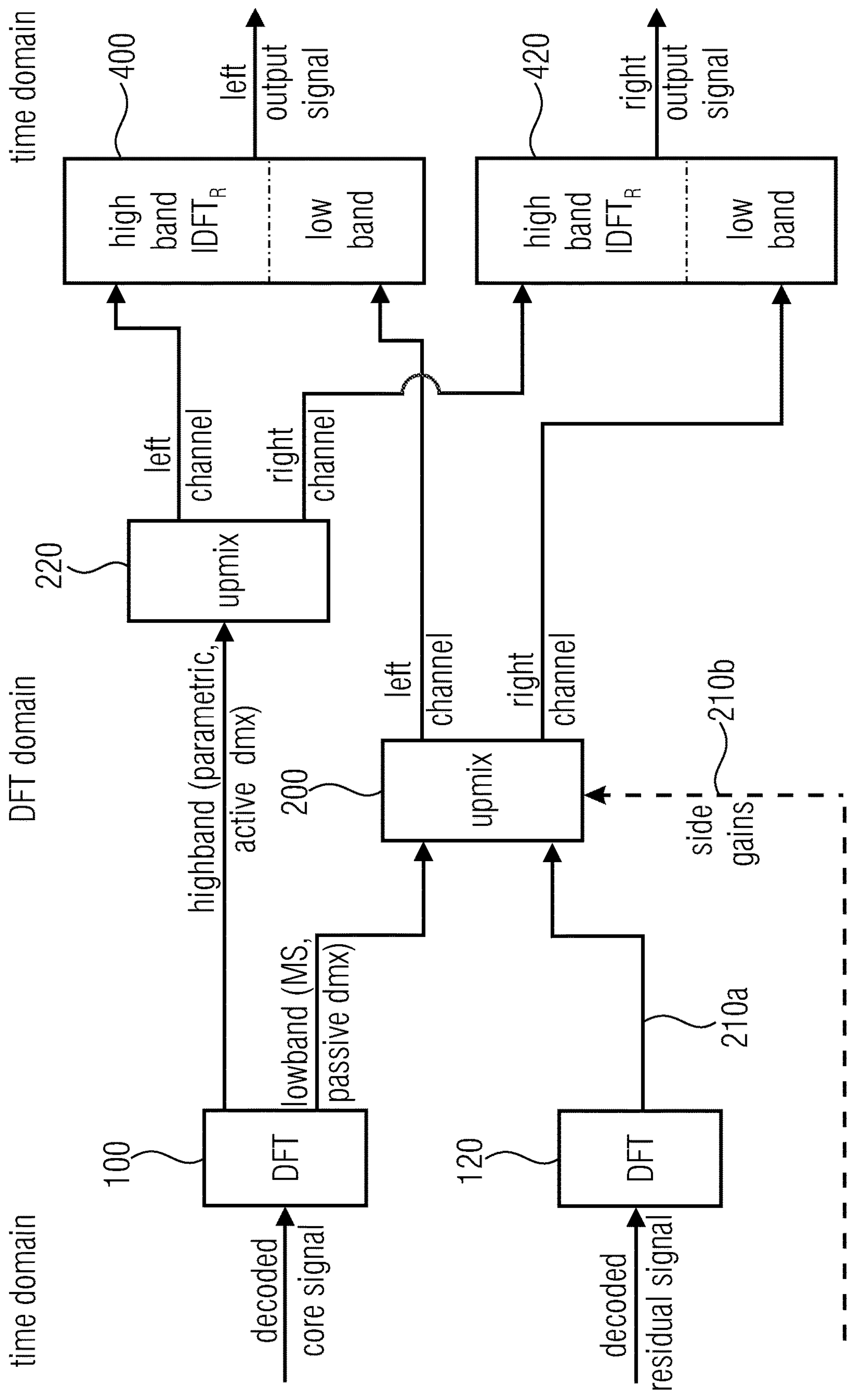
FIG. 6 illustrates a multichannel decoder operating in a stereo output mode.

FIG. 6 illustrates an implementation of a multichannel decoder for a stereo output. The multichannel decoder comprises elements of FIG. 4 that are indicated with the same reference numbers. Additionally, the stereo multichannel decoder comprises a second upmixer 220 for upmixing the highband downmix, i.e., the second portion into a second upmix representation comprising, for example, a left channel and a right channel for a stereo output as one implementation of the multichannel decoder. For another implementation of the multichannel decoder, where there are more than two output channels, such as three or more output channels, the upmixer 220 as well as the upmixer 200 would generate a corresponding higher number of output channels rather than only the left channel and the right channel.

Furthermore, a second combiner 420 is illustrated in FIG. 6 for the multichannel decoder, i.e., for the illustrated stereo decoder. In case of more than two outputs, a further combiner would be there for the third output channel and another one for the fourth output channel and so on. In contrast to FIG. 6, however, the downmixer 300 of FIG. 4 is not necessary for the multichannel output.

Figure 7:
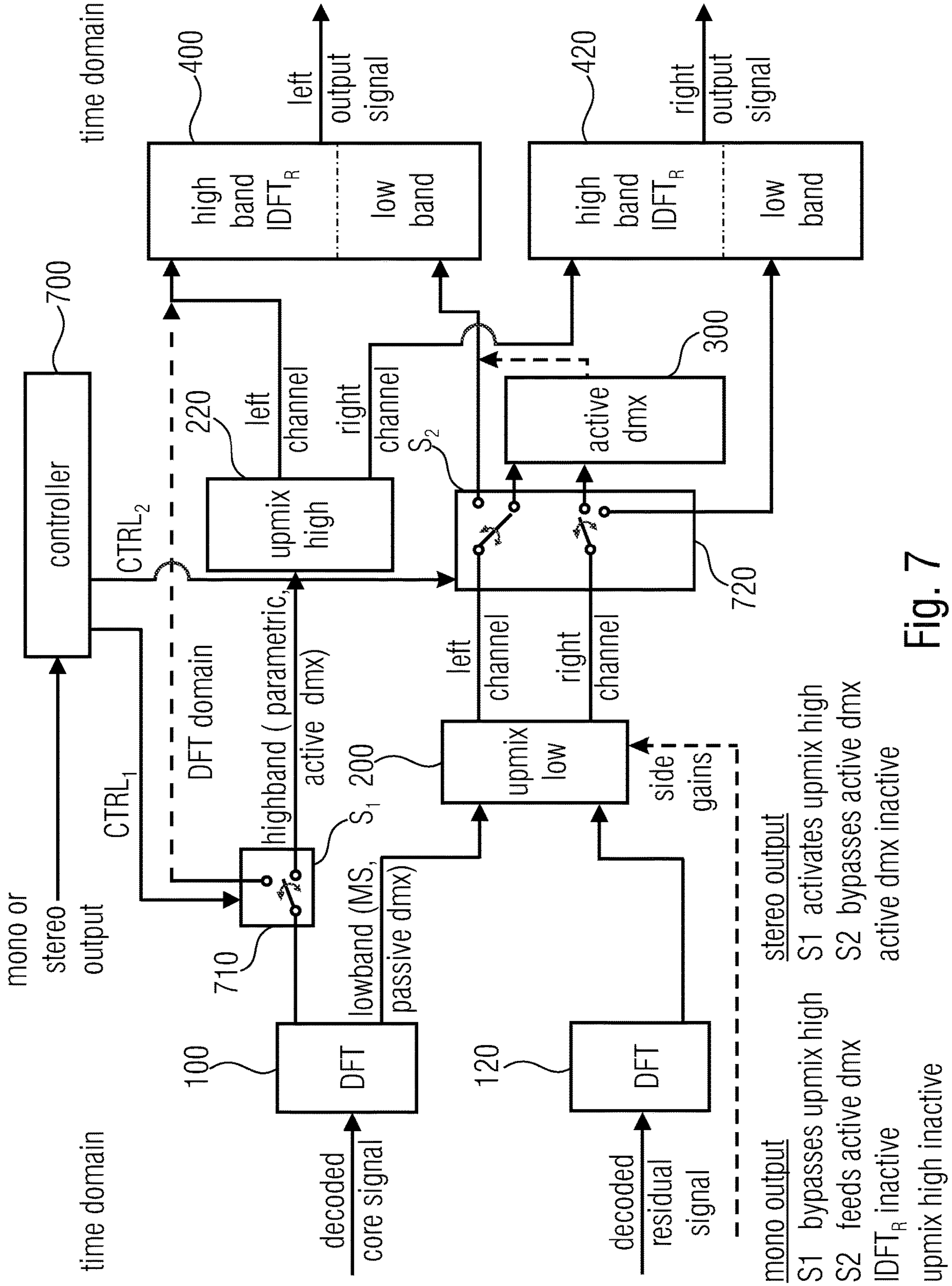
FIG. 7 illustrates a multichannel encoder in accordance with an embodiment that is switchable between the multichannel output mode or the mono output mode.

FIG. 7 illustrates an advantageous implementation of a switchable multichannel decoder which is switchable by means of the actuation of a controller 700, between a mono mode or a stereo/multichannel output mode. Furthermore, in contrast to FIG. 6, the multichannel decoder additionally comprises the downmixer 300 already described with respect to FIG. 4 or the other figures. Furthermore, in the switchable implementation, one option is to provide two individual switches S1, S2. However, the switching functionalities illustrated at the bottom of FIG. 7 can also be implemented by other switching means such as combined switches or even more than two switches. Generally, switch 1 is configured to operate in the mono output mode, so that the second upmixer 220 also indicated as "upmix high" is bypassed. Furthermore, the second switch S2 is configured by the second control signal $CTRL_2$ to feed the active downmix 300 with the output of the upmixer 200 indicated as "upmix low" in FIG. 7. Furthermore, in the mono output mode, the upmix high block 220 described with respect to FIG. 6 is inactive and, additionally, the second combiner 420 indicated as "$IDFT_R$ is inactive as well, since only a single combiner 400 for the generation of the single mono output signal may be used.

Contrary thereto, in the stereo output mode or, generally, in the multichannel output mode, the controller 700 is configured to activate, via control signal $CTRL_1$ the first switch so that the output of the first time-to-frequency converter 100 is fed into the second upmixer 220 indicated as "upmix high" in FIG. 7. By means of the actuation of switch S1, the second combiner 220 is activated. Furthermore, the controller 700 is configured to control the second switch S2720 so that the output of block 200 is not input into the active downmixer 300, but the downmixer 300 is bypassed. The left channel (lowband) portion of the output of block 200 is forwarded as the lowband portion for the combiner 400 and the right channel lowband portion at the output of block 200 is forwarded to the lowband input of the second combiner 420 as illustrated in FIG. 7. Furthermore, in the stereo/multichannel output mode, the downmix 300 is inactive.

Figure 8A:
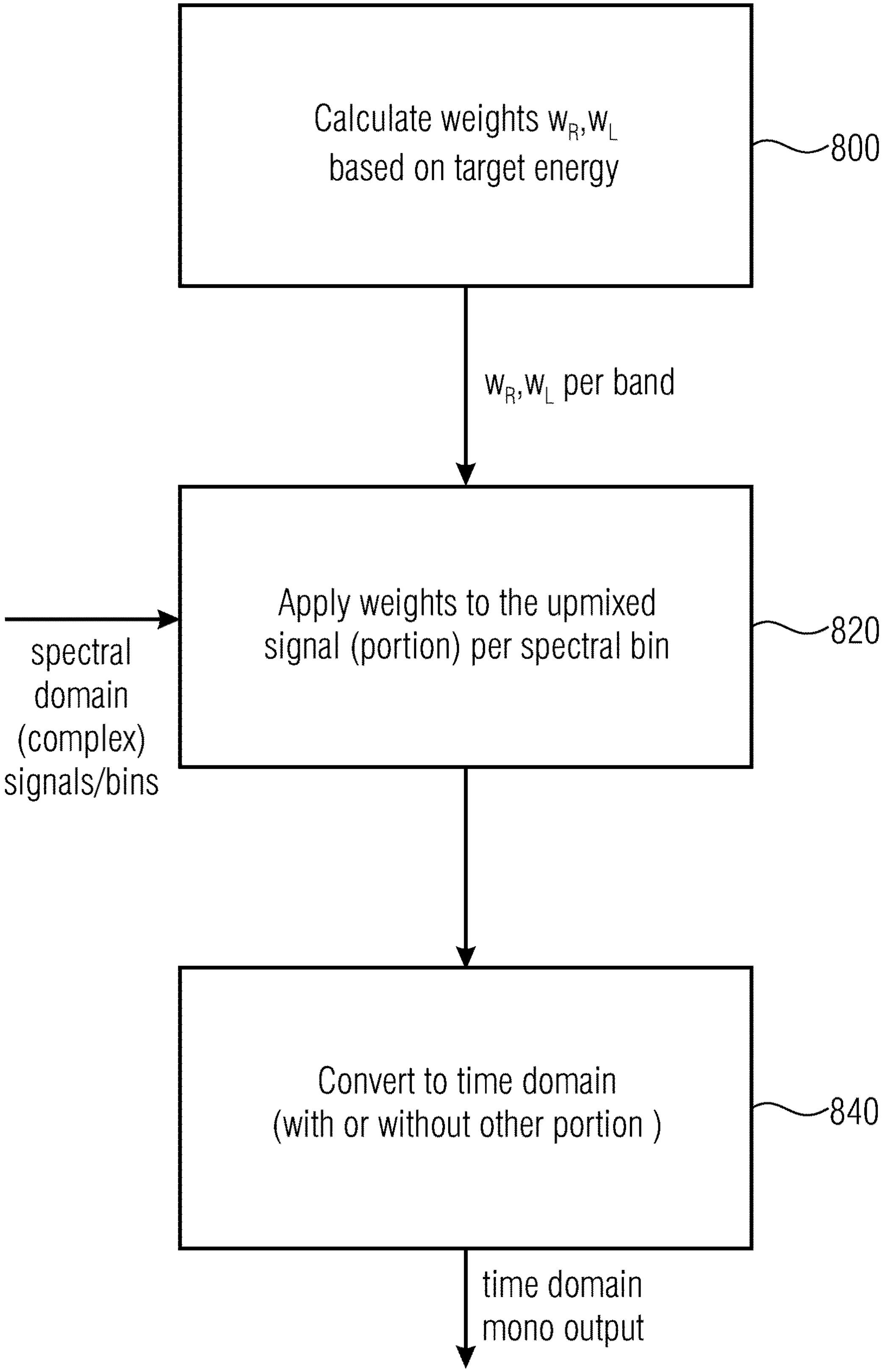
FIG. 8*a* illustrates an advantageous implementation for the second downmixing scheme.

FIG. 8*a* illustrates a flow chart for an embodiment used in the downmix 300 for performing an active downmix. In a step 800, weights $w_R$ and $w_L$ are calculated based on a target energy. This is done per band such that a weight $w_R$ for the right channel and a weight $w_L$ for the left channel are obtained for each band.

In block 820, the weights are applied to the upmixed signal over the whole bandwidth of the signal under consideration or only in the corresponding portion per spectral bin. To this end, block 820 receives the spectral domain (complex) signals or bins or spectral values. Subsequent to the application of the weights and, particularly, an addition of the weighted values to obtain the downmix, a conversion 840 to the time domain is performed. Depending on whether only a portion or the full band is processed in block 820, the conversion to the time domain takes place without any other portion or takes place with the other portion particularly in the context of a harmonized downmix as, for example, illustrated and discussed with respect to FIG. 3 or FIG. 4.

Figure 8B:
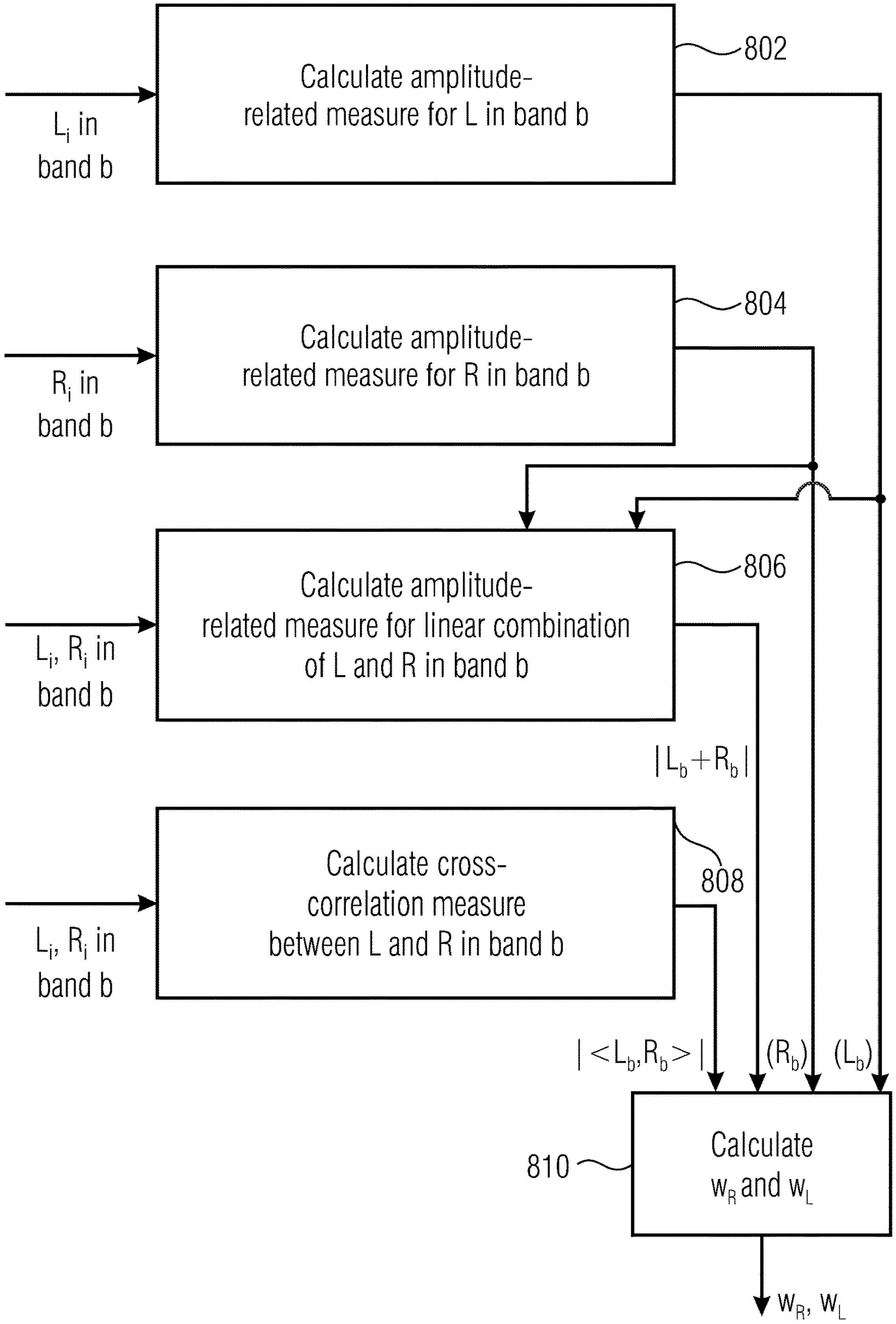
FIG. 8*b* illustrates a further embodiment of the second downmixing scheme.

FIG. 8*b* illustrates an advantageous implementation of the functionalities performed in block 800 of FIG. 8*a*. In particular, for the calculation of the weights $w_R$ and $w_L$ for each band, an amplitude-related measure for L is calculated for a band. To this end, the individual spectral lines for the left channel, i.e., for the left channel as output by block 200 of any of the FIGS. 1 to 7 are input. In block 804, the same procedure is performed for the second channel or right channel in the same band b. Furthermore, in block 806, another amplitude-related measure is calculated for a linear combination of L and R in the band b. In block 806, once again, the spectral values of the first channel L, the spectral values for the second channel R may be used for the band under consideration. In block 808, a cross-correlation measure is calculated between the left channel and the right channel or, generally, between the first channel and the second channel in the corresponding band b. To this end, once again, the spectral values at indices e for the first and the second channels may be used for the corresponding band.

As illustrated, the amplitude-related measure can be the square root over the squared magnitudes of the spectral values in a band. This is illustrated as $|L_b|$. Another amplitude-related measure would, for example, be the sum over the magnitudes of the spectral lines in the band without any square root or with an exponent being different from ½ such as an exponent being between 0 and 1 but excluding 0 and 1. Furthermore, the amplitude-related measure could also refer to a sum over exponentiated magnitudes of spectral lines where the exponent is different from 2. For example, using an exponent of 3 would correspond to the loudness in psychoacoustic terms. However, other exponents being greater than 1 would be useful as well.

The same is true for the amplitude-related measure calculated in block 804 or the amplitude-related measure calculated in block 806.

Furthermore, with respect to the cross-correlation measure calculated in block 808, the corresponding mathematical equation illustrated before also relies on a squaring of the dot products and the calculation of a square root. However, other exponents for the dot products different from 2 such as exponents equal to 3 corresponding to a loudness domain or exponents greater than 1 can be used as well. At the same time, instead of the square root, other exponents different from ½ can be used such as ⅓ or, generally, any exponent being between 0 and 1.

Furthermore, block 810 indicates the calculation of $w_R$ and $w_L$ based on the three amplitude-related measures and the cross-correlation measure. Although it has been indicated that the target energy is preserved by the downmix and is equal to the energy of the phase-rotated mid-channel, it is not necessary, neither for the calculation of $w_R$ and $w_L$ nor for the calculation of the actual downmix signal that such a rotation with a rotation angle is actually performed. Instead, the only thing that is highly expedient when the actual rotation with the rotation angle $\phi$ is not performed is the calculation of the cross-correlation measure between L and R in the corresponding bands b. In the previously described embodiment, although it has been indicated that an energy of a phase-rotated mid-channel is used as the target energy, any other target energies can be used or any phase rotation has not to be performed at all. With respect to other target energies, these target energies are energies that make sure that an energy of the downmix signal generated by the downmix 300 is fluctuating for the same signal less than the energy of a passive downmix as, for example, underlying the decoded core signal input into block 100 of FIG. 4.

FIG. 9 illustrates a general representation of a spectrum indicating a lowband first portion that is provided, with respect to the input downmix representation, as a downmix with residual data and indicating a second portion that is provided, with respect to the input downmix representation, by a downmix generated with weights as discussed before with respect to FIG. 8*a*, 8*b*. Although FIG. 9 illustrates only six bands, where three bands are for the first portion and three bands are for the second portion, and although FIG. 9 illustrates certain bandwidths that increase from lower bands to higher bands, the specific numbers, the specific bandwidths and the separation of the spectrum into the first portion and into the second portion are only exemplary. In a real scenario, a significantly higher number of bands will be there and, additionally, the first portion that, additionally, has the residual signal will be less than 50% of the number of bands b.

Advantageously, the time-to-spectral converters 100, 120 of FIGS. 4, 6 and 7 and the combiner 400, 420 are implemented as DFT or IDFT blocks that advantageously implement an FFT or IFFT algorithm. For the processing of a continuous decoded signal input into blocks 100, 120, a block wise processing is performed where overlapping blocks are formed, analysis filtered, transformed into the spectral domain, processed and, in the combiners 400, 420 synthesis filtered, and combined, once again with a 50% overlap. The combination of a 50% overlap on the synthesis side will typically be performed by an overlap add operation with a cross fading from one block to the other where, advantageously, the cross fading weights are already included in the analysis/synthesis windows. However, when this is not the case, an actual cross fading is performed at the output of block 400, for example, or 420, for example, of FIG. 7 or FIG. 6, so that each time domain output sample of either the mono output signal or the left output signal or the right output signal is generated by an addition of two values of two different blocks. For an overlap of more than 50%, an overlap between three or corresponding even more blocks can be performed as well.

Alternatively, when the time-to-spectral conversion on the one hand and the spectral-time-conversion on the other hand are performed with, for example, a modified discrete cosine transform, an overlap processing is used as well. On the spectral-to-time conversion side, an overlap-add processing is performed so that, once again, each output time domain sample is obtained by summing corresponding time domain samples from two (or more) different IMDCT blocks.

Advantageously, the harmonization of the downmixing schemes is performed fully in the spectral domain as illustrated in FIGS. 4, 6 and 7. Any additional time-spectrum-transform or spectrum-time-transform is not required when switching from mono to stereo or from stereo to mono as illustrated in FIG. 7. Only manipulations of data in the spectral domain either by the downmixer 300 for the mono output mode or by the second upmixer 220 (upmix high) for the stereo output mode have to be done. The whole delay of the processing is the same either for mono or stereo output and this is also a significant advantage since any subsequent processing operations or preceding processing operations do not have to be aware of whether there is a mono or a stereo output signal.

Advantageous embodiments remove artifacts and spectral loudness imbalances that stem from having different downmix methods in different spectral bands in the decoded core signal of a system as described in [8] without the additional delay and significantly higher complexity that a dedicated post-processing stage would bring about.

Embodiments provide, in an aspect, an upmix and a subsequent downmix at the decoder of one (or more) spectral or time parts of a mono signal, that was downmixed using one or more than one downmix method, in order to harmonize all spectral or time parts of the signal.

The present invention provides, in an aspect, a harmonization of a stereo-to-mono downmix at the decoder side.

In an embodiment, the output downmix is for a replay device that receives the downmix included in the output representation and feeds this downmix of the output representation into a digital to analog converter and the analog downmix signal is rendered by one or more loudspeakers included in the replay device. The replay device may be a mono device such as a mobile phone, a tablet, a digital clock, a Bluetooth speaker etc.

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] ITU-R BS.775-2, *Multichannel Stereophonic Sound System With And Without Accompanying Picture*, July 2006.

[2] F. Baumgarte, C. Faller und P. Kroon, "Audio Coder Enhancement using Scalable Binaural Cue Coding with Equalized Mixing," in 116*th Convention of the AES*, Berlin, 2004.

[3] G. Stoll, J. Groh, M. Link, J. Deigmöller, B. Runow, M. Keil, R. Stoll, M. Stoll und C. Stoll, "Method for Generating a Downward-Compatible Sound Format". USA Patent US 2012/0014526, 2012.

[4] M. Kim, E. Oh und H. Shim, "Stereo audio coding improved by phase parameters," in 129*th Convention of the AES*, San Francisco, 2010.

[5] A. Adami, E. Habets und J. Herre, "Down-mixing using coherence suppression," in *IEEE International Conference on Acoustics, Speech and Signal Processing*, Florence, 2014.

[6] ISO/IEC 23008-3*: Information technology—High efficiency coding and media delivery in heterogeneous environments—Part* 3: 3*D audio,* 2019.

[7] S. Bayer, C. Borß, J. Büthe, S. Disch, B. Edler, G. Fuchs, F. Ghido und M. Multrus, "DOWNMIXER AND METHOD FOR DOWNMIXING AT LEAST TWO CHANNELS AND MULTICHANNEL ENCODER AND MULTICHANNEL DECODER". Patent WO18086946, 17052018.

[8] S. Bayer, M. Dietz, S. Döhla, E. Fotopoulou, G. Fuchs, W. Jaegers, G. Markovic, M. Multrus, E. Ravelli und M. Schnell, "APPARATUS AND METHOD FOR ESTIMATING AN INTER-CHANNEL TIME DIFFERENCE". Patent WO17125563, 27072017.

The invention claimed is:

1. An apparatus for generating an output downmix representation from an input downmix representation, wherein a first portion of the input downmix representation is in accordance with a first downmixing scheme, and a second portion of the input downmix representation is in accordance with a second downmixing scheme, the apparatus comprising:

an upmixer for upmixing the first portion of the input downmix representation using an upmixing scheme corresponding to the first downmixing scheme to acquire at least one first upmixed portion, wherein the first portion of the input downmix representation is a first frequency band of a spectrum and the second portion of the input downmix representation is a second frequency band of the spectrum;

a downmixer for downmixing the at least one first upmixed portion in accordance with the second downmixing scheme different from the first downmixing scheme to acquire a first downmixed portion; and a combiner configured for combining the first downmixed portion and the second portion of the input downmix representation to obtain the output downmix representation comprising a first output representation for the first portion of the input downmix representation and a second output representation for the second portion of the input downmix representation, wherein the first output representation for the first portion of the input downmix representation and the second output representation for the second portion of the input downmix representation represent the output downmix representation and are based on the second downmixing scheme.

2. A method for generating an output downmix representation from an input downmix representation-, wherein a first portion of the input downmix representation is in accordance with a first downmixing scheme, and wherein a second portion of the input downmix representation is in accordance with a second downmixing scheme, the method comprising:

upmixing the first portion of the input downmix representation using an upmixing scheme corresponding to the first downmixing scheme to acquire at least one first upmixed portion, wherein the first portion of the input downmix representation is a first frequency band of a spectrum and the second portion of the input downmix representation is a second frequency band of the spectrum;

downmixing the at least one first upmixed portion in accordance with the second downmixing scheme different from the first downmixing scheme to acquire a first downmixed portion; and combining the first downmixed portion and the second portion of the input downmix representation to obtain the output downmix representation comprising a first output representation for the first portion of the input downmix representation and a second output representation for the second portion of the input downmix representation, wherein the first output representation for the first portion of the input downmix representation and the second output representation for the second portion of the input downmix representation represent the output downmix representation and are based on the second downmixing scheme.

3. A non-transitory digital storage medium having a computer program stored thereon to perform, when said computer program is run by a computer, a method for generating an output downmix representation from an input downmix representation, wherein a first portion of the input downmix representation is in accordance with a first downmixing scheme, and wherein a second portion of the input downmix representation is in accordance with a second downmixing scheme, the method comprising:

upmixing the first portion of the input downmix representation using an upmixing scheme corresponding to the first downmixing scheme to acquire at least one first upmixed portion, wherein the first portion of the input downmix representation is a first frequency band of a spectrum and the second portion of the input downmix representation is a second frequency band of the spectrum;

downmixing the at least one first upmixed portion in accordance with the second downmixing scheme different from the first downmixing scheme to acquire a first downmixed portion; and combining the first downmixed portion and the second portion of the input downmix representation to obtain the output downmix representation comprising a first output representation for the first portion of the input downmix representation and a second output representation for the second portion of the input downmix representation, wherein the first output representation for the first portion of the input downmix representation and the second output representation for the second portion of the input downmix representation represent the output downmix representation and are based on the second downmixing scheme.

4. An apparatus for generating an output downmix representation, comprising:

an interface for receiving an input downmix representation, wherein a first portion of the input downmix representation is a first frequency band of a spectrum and is in accordance with a first downmixing scheme and a second portion of the input downmix representation is a second frequency band of the spectrum and is in accordance with a second downmixing scheme, wherein the second downmixing scheme is different from the first downmixing scheme;

an upmixer for upmixing the first portion of the input downmix representation using a first upmixing scheme corresponding to the first downmixing scheme to acquire at least one first upmixed portion and for upmixing the second portion of the input downmix representation using a second upmixing scheme corresponding to the second downmixing scheme to acquire at least one second upmixed portion; and a downmixer for downmixing the at least one first upmixed portion in accordance with a third downmixing scheme to acquire a first portion of the output downmix representation and for downmixing the at least one second upmixed portion in accordance with the third downmixing scheme to acquire a second portion of the output downmix representation, wherein the third downmixing scheme is different from the first downmixing scheme and the second downmixing scheme, wherein the first portion of the output downmix representation is a first frequency band of a spectrum of the output downmix representation and wherein the second portion of the output downmix representation is a second frequency band of the spectrum of the output downmix representation, and wherein the first portion of the output downmix representation and the second portion of the output downmix representation are based on the third downmixing scheme.

5. A method for generating an output downmix representation, comprising:

receiving an input downmix representation, wherein a first portion of the input downmix representation is a first frequency band of a spectrum and is in accordance with a first downmixing scheme and a second portion of the input downmix representation is a second frequency band of the spectrum and is in accordance with a second downmixing scheme, wherein the second downmixing scheme is different from the first downmixing scheme;

upmixing the first portion of the input downmix representation using a first upmixing scheme corresponding to the first downmixing scheme to obtain at least one first upmixed portion and upmixing the second portion of the input downmix representation using a second upmixing scheme corresponding to the second downmixing scheme to obtain at least one second upmixed portion; and downmixing the at least one first upmixed portion in accordance with a third downmixing scheme to acquire a first portion of the output downmix representation and downmixing the at least one second upmixed portion in accordance with the third downmixing scheme to acquire a second portion of the output downmix representation, wherein the third downmixing scheme is different from the first downmixing scheme and the second downmixing scheme, wherein the first portion of the output downmix representation is a first frequency band of a spectrum of the output downmix representation and wherein the second portion of the output downmix representation is a second frequency band of the spectrum of the output downmix representation, and wherein the first portion of the output downmix representation and the second portion of the output downmix representation are based on the third downmixing scheme.

6. A non-transitory digital storage medium having a computer program stored thereon to perform, when said computer program is run by a computer, a method of generating an output downmix representation, the method comprising:

receiving an input downmix representation, wherein a first portion of an input downmix representation is a first frequency band of a spectrum and is in accordance with a first downmixing scheme and a second portion of the input downmix representation is a second frequency band of the spectrum and is in accordance with a second downmixing scheme, wherein the second downmixing scheme is different from the first downmixing scheme;

upmixing the first portion of the input downmix representation using a first upmixing scheme corresponding to the first downmixing scheme to obtain at least one first upmixed portion and upmixing the second portion of the input downmix representation using a second upmixing scheme corresponding to the second downmixing scheme to obtain at least one second upmixed portion; and downmixing the at least one first upmixed portion in accordance with a third downmixing scheme to acquire a first portion of the output downmix representation and downmixing the at least one second upmixed portion in accordance with the third downmixing scheme to acquire a second portion of the output downmix representation, wherein the third downmixing scheme is different from the first downmixing scheme and the second downmixing scheme, wherein the first portion of the output downmix representation is a first frequency band of a spectrum of the output downmix representation and wherein the second portion of the output downmix representation is a second frequency band of the spectrum of the output downmix representation, and wherein the first portion of the output downmix representation and the second portion of the output downmix representation are based on the third downmixing scheme.

* * * * *